United States Patent
Rosen et al.

(10) Patent No.: US 6,904,288 B2
(45) Date of Patent: Jun. 7, 2005

(54) CONTROLLER FOR PROVIDING AN EFFICIENT DORMANT MODE FOR A GROUP COMMUNICATION NETWORK

(75) Inventors: Eric Rosen, Solana Beach, CA (US); Mark Maggenti, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 537 days.

(21) Appl. No.: 10/075,884

(22) Filed: Feb. 12, 2002

(65) Prior Publication Data

US 2002/0177461 A1 Nov. 28, 2002

Related U.S. Application Data

(60) Provisional application No. 60/291,454, filed on May 15, 2001.

(51) Int. Cl.[7] .............................. H04B 7/00; H04H 1/00; H04L 12/66
(52) U.S. Cl. ....................... 455/518; 455/528; 370/312; 370/352
(58) Field of Search ............................. 455/422.1, 517, 455/528, 560, 518; 370/312, 352

(56) References Cited

U.S. PATENT DOCUMENTS

| | | |
|---|---|---|
| 5,745,860 A | 4/1998 | Kallin |
| 5,884,196 A | 3/1999 | Lekven et al. |
| 6,032,050 A | 2/2000 | Hasegawa |
| 6,477,150 B1 * | 11/2002 | Maggenti et al. ........... 370/462 |
| 6,714,987 B1 * | 3/2004 | Amin et al. ................. 709/249 |

* cited by examiner

Primary Examiner—Sonny Trinh
Assistant Examiner—Sam Bhattacharya
(74) Attorney, Agent, or Firm—Philip R. Wadsworth; Robert J. O'Connell; John L. Ciccozzi

(57) ABSTRACT

A method and apparatus for providing an efficient dormant mode for push-to-talk communication devices in a group communication network provides for determining whether the net has been inactive for a predetermined first time period and, if so, causing each member of the net to enter a control-hold mode, wherein each member of the net maintains its dedicated traffic channel. The method further includes the steps of determining whether each member of the net has been in the control-hold mode for a predetermined second time period and, if so, causing each member of the net to enter a dormant mode, wherein each member of the net releases its dedicated traffic channel. The method and apparatus further provides for causing each member of the net to cache its service configuration state before entering the dormant mode.

8 Claims, 7 Drawing Sheets

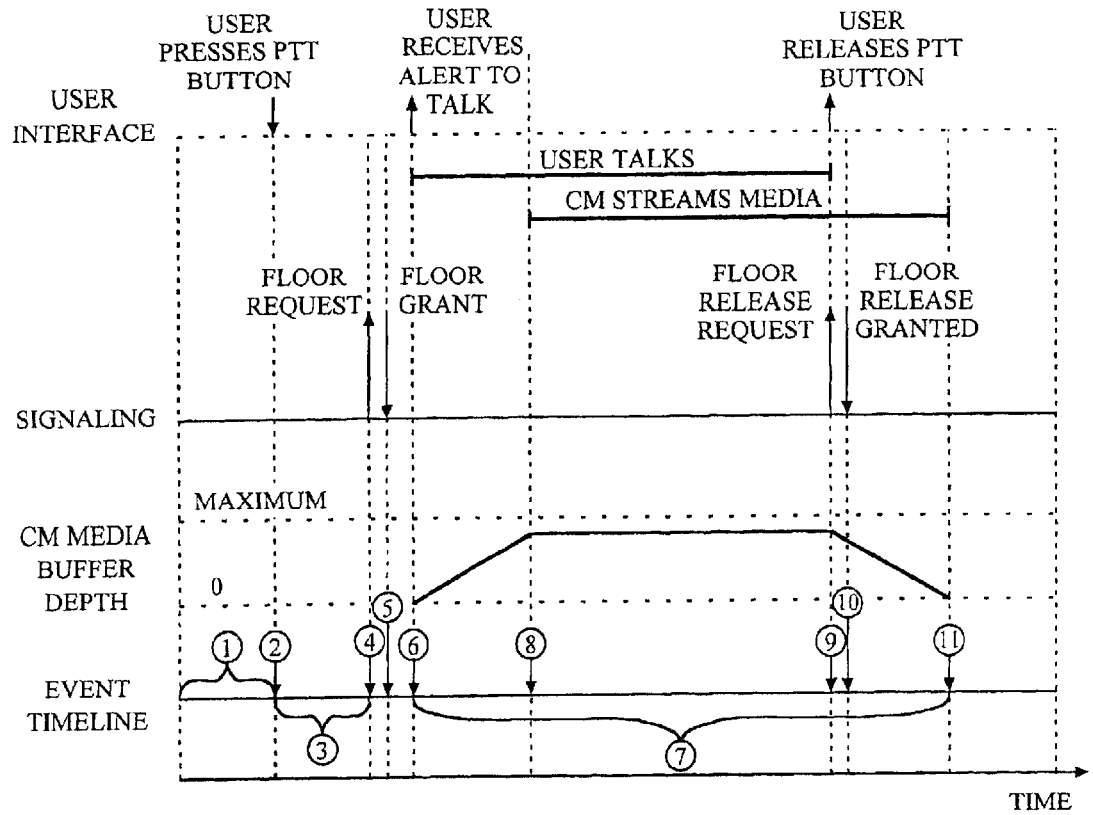

① Group is Dormant
② User presses the PTT Button.
③ Client re-establishes a packet data connection.
④ Packet data connection has been established; floor request is transmitted to CM
⑤ Client receives grant of floor from CM.
⑥ User is alerted to begin speaking; media is streamed to
⑦ CM buffers media from talker
⑧ CM receives indication that listener phones have re-established their traffic channels, and begins streaming media to listeners' phones.
⑨ User finishes talking and releases his PTT button; floor release request is
⑩ Floor release is granted to
⑪ CM stops streaming media to

FIG. 5

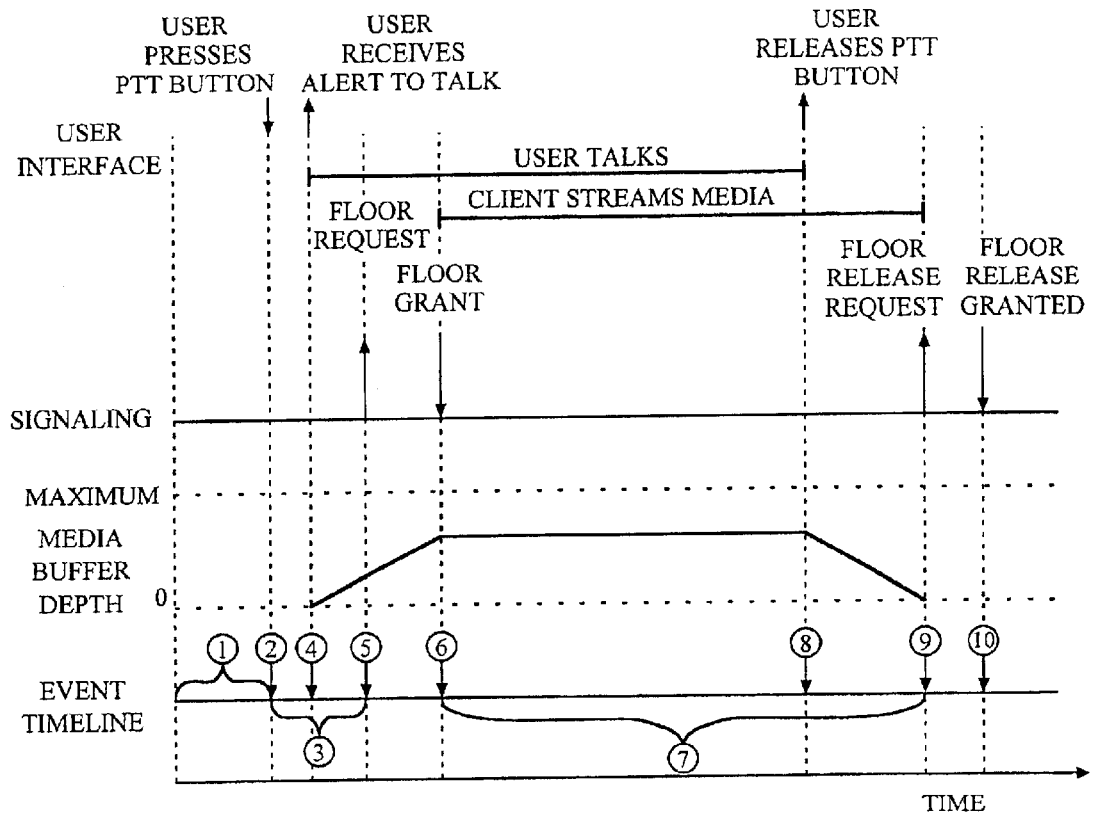

① Group is Dormant
② User presses the PTT Button.
③ Client begins process of re-establishing a packet data traffic channel.
④ Client alerts user that floor has been granted after a configurable delay and begins buffering user media.
⑤ Client successfully re-establishes traffic channel. Client transmits request for floor to CM.
⑥ Client is granted the floor by the CM
⑦ Client streams buffered media to CM.
⑧ User releases the PTT button. Client stops buffering media.
⑨ Client finishes streaming buffered media to CM, requests release of the floor by the CM.
⑩ Client receives acknowlegement of floor release from the CM

FIG. 6

CONTROLLER FOR PROVIDING AN EFFICIENT DORMANT MODE FOR A GROUP COMMUNICATION NETWORK

CROSS-REFERENCE TO RELATED APPLICATION

This application claims the benefit of U.S. Provisional Patent Application Ser. No. 60/291,454, filed May 15, 2001, which is incorporated herein by reference in its entirety.

FIELD

The present invention relates to point to multi-point communications systems. More specifically, the present invention relates to a method and apparatus for providing an efficient dormant mode for push-to-talk communication devices in a group communication network.

BACKGROUND

A class of wireless service intended for quick, efficient, one-to-one or one-to-many (group) communication has existed in various forms for many years. In general, these services have been half-duplex, where a user presses a "push-to-talk" (PTT) button on his phone/radio to initiate speech. Pushing the button either keys his radio, in some implementations, or in a moderated system, where communications occurs via a server of some type, indicates the user's request for the "floor." If granted the floor, or talker permission, the user then generally speaks for a few seconds, after which he releases his PTT button, and other speakers can request the floor. Communication is generally from one speaker to a group of listeners, but may be one-to-one. This service has traditionally been used in applications where one person, a "dispatcher," needs to communicate to a group of people, such as field service personnel or taxi drivers, which is where the "dispatch" name for the service comes from.

Recently, similar services have been offered on the Internet and are generally known as "voice chat." These services are usually implemented as personal computer applications that send vocoder frames in Internet protocol (IP) packets, i.e., voice-over-IP (VoIP) service, to a central group chat server, or possibly from client to client in a peer-to-peer service.

A key feature of these services is that communication is quick and spontaneous, usually initiated by simply pressing a PTT button, without going through a typical dialing and ringing sequence. Communication in this type of service is generally very short, with individual talk "spurts" being generally on the order of several seconds, and "conversations" lasting possibly a minute or less.

The time delay between when the user requests the floor and when he receives a positive or negative confirmation from the server that he has the floor and may begin speaking, which is known as the PTT latency, is a critical parameter for half-duplex group communications systems. As mentioned previously, dispatch systems place a priority on short, quick conversations, which makes the service less effective if the PTT latency becomes large.

Existing group communication infrastructures provide limited opportunities for significantly reducing the PTT latency, i.e., actual PTT latency may not be possibly reduced below the time required to re-establish traffic channels within dormant packet-data sessions. Further, talker and listeners traffic channels are brought up in series, because the only mechanism available to begin waking up a dormant group is to wait for the talker's traffic channel to be re-established to signal the server. Currently, no mechanism exists to send mobile-originated user signaling data on anything other than a traffic channel—a limitation that requires traffic channels to be re-established before any communication between clients and the server can take place.

There is a need, therefore, for mechanisms to reduce both apparent PTT latency experienced by the talker and total time required to re-establish traffic channels for participating mobiles without negatively impacting system capacity, client battery life, or other resources.

SUMMARY OF THE INVENTION

The disclosed embodiments provide a novel and improved method and apparatus for providing an efficient dormant mode for push-to-talk communication devices in a group communication network. In one aspect of the invention, a method for providing an efficient dormant mode includes the steps of determining whether the net has been inactive for a predetermined first time period and, if so, causing each member of the net to enter a control-hold mode, wherein each member of the net maintains its dedicated traffic channel. The method further includes the steps of determining whether each member of the net has been in the control-hold mode for a predetermined second time period and, if so, causing each member of the net to enter a dormant mode, wherein each member of the net releases its dedicated traffic channel.

In another aspect of the invention, a method for providing an efficient dormant mode for push-to-talk communication devices in a group communication network includes the steps of determining whether the net has been inactive for a predetermined time period, causing each member of the net to enter the dormant mode if it is determined that each member of the net has been inactive for the predetermined time period, and causing each member of the net to cache a state of its service configuration before entering the dormant mode.

In another aspect of the invention, a controller for providing a dormant mode for push-to-talk communication devices in a group communication network includes a receiver, a memory unit, a transmitter, and a processor communicatively coupled with the receiver, the memory unit, and the transmitter. The processor is capable of performing the above steps.

BRIEF DESCRIPTION OF THE DRAWINGS

The features and advantages of the present invention will become more apparent from the detailed description set forth below when taken in conjunction with the drawings in which like reference characters identify correspondingly throughout and wherein:

FIG. 5 illustrates buffering media at a communications manager side according to one embodiment;

FIG. 6 illustrates buffering media at a client side according to one embodiment.

DETAILED DESCRIPTION

Figure 1:
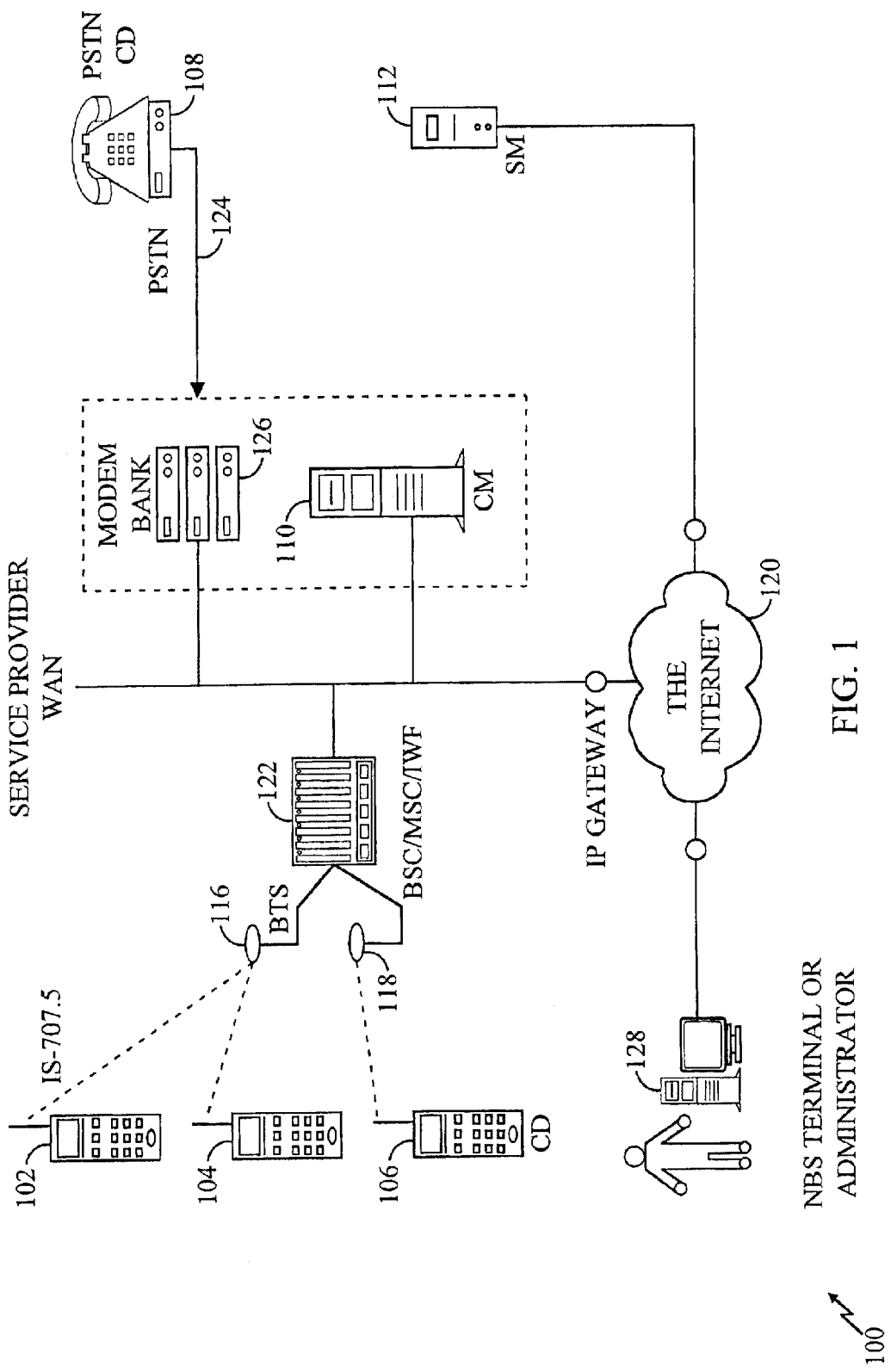
FIG. 1 illustrates a group communications system.

Before one embodiment of the invention is explained in detail, it is to be understood that the invention is not limited in its application to the details of the construction and the arrangement of the components set forth in the following description or illustrated in the drawings. The invention is capable of being implemented in other embodiments and are carried out in various ways. Also, it is understood that the phraseology and terminology used herein is for purpose of description and should not be regarded as limiting.

FIG. 1 illustrates an exemplary functional block diagram of a group communication system 100. The group communication system 100 is also known as a push-to-talk system, a net broadcast service (NBS), a dispatch system, or a point-to-multi-point communication system. In the NBS 100, a group of communication device users, individually known as net members, communicate with one another using a communication device assigned to each net member. The term "net" denotes a group of communication device users authorized to communicate with each other.

In one embodiment, a central database may contain information identifying the members of each particular net. More than one net may operate in the same communication system. For instance, a first net may be defined having ten members and a second net may be defined, having twenty members. The ten members of the first net may communicate with each other, but may not communicate with members of the second net. In another embodiment, members of different nets are able to monitor communications between members of more than one net, but may be only able to transmit information to members within their own net.

A net may operate over an existing communications system, without requiring substantial changes to the existing infrastructure. Thus, a controller and users on a net may operate in any system capable of transmitting and receiving packet information using Internet protocol (IP), such as a Code Division Multiple Access (CDMA) system, a Time Division Multiple Access (TDMA) system, a Global System for Mobile Communications (GSM) system, satellite communication systems such as Globalstar™ or Iridium™, or a variety of other systems.

Net members may communicate with each other using an assigned communication device, shown as communication devices (CDs) 102, 104, 106 and 108. CDs 102, 104, 106 and 108 may be wireline or wireless communication devices such as terrestrial wireless telephones, wireline telephones having with push-to-talk capability, satellite telephones equipped with push-to-talk functionality, wireless video cameras, still cameras, audio devices such as music recorders or players, laptop or desktop computers, paging devices, or any combination thereof. For example, the CD 102 may comprise a wireless terrestrial telephone having a video camera and display. Furthermore, each CD may be able to send and receive information in either a secure mode, or a non-secure (clear) mode. Throughout the following discussion, reference to an individual CD infers a wireless push-to-talk phone. However, it should be understood that reference to a CD is not intended to be limited as such, and may encompass other communication devices that have the capability to transmit and receive packet information in accordance with the Internet Protocol (IP).

Figure 2:
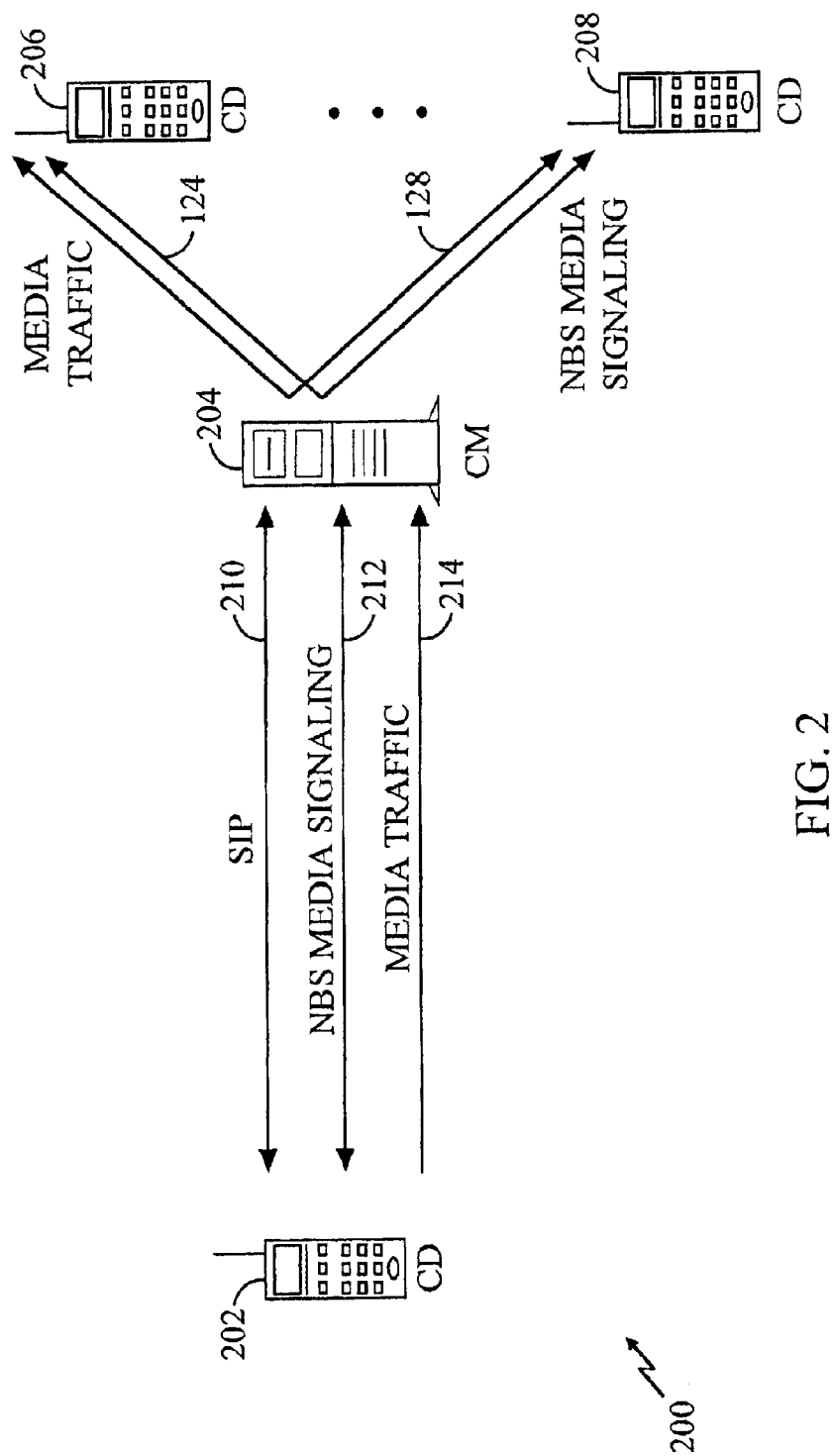
FIG. 2 illustrates how several communication devices interact with a communications manager.

In the NBS system 200 of FIG. 2, a transmission privilege generally allows a single user to transmit information to other net members at a given time. The transmission privilege is granted or denied to a requesting net member, depending on whether or not the transmission privilege is currently assigned to another net member when the request is received. The process of granting and denying transmission requests is known as arbitration. Arbitration schemes may evaluate factors such as priority levels assigned to each CD, the number of unsuccessful attempts to gain transmission privilege, the length of time a net member has held transmission privilege, or other factors, in determining whether a requesting net member is granted the transmission privilege.

In order to participate in the NBS system 100, CDs 102, 104, 106, and 108 each may have the ability to request transmission privilege from a controller or a communications manager (CM) 110. CM 110 may manage the real-time and administrative operation of nets. The CM is any type of computer type device having at least one processor and memory. In one embodiment, the CM is a Sun Workstation Netra T1™.

CM 110 may operate remotely through either a communication system service provider, net members, or both, assuming that authorization is provided by the service provider. CM 110 may receive net definitions through an external administration interface. Net members may request administrative actions through their service provider or administrate net functions through defined systems, such as a member-operated security manager (SM) 112 that conforms to a CM administration interface. CM 110 may authenticate the party who attempts to establish or modify a net.

SM 112 may perform key management, user authentication, and related tasks to support secure nets. A single group communication system may interact with one or more SM 112. SM 112 may not be involved in the real-time control of a net, including net activation or PTT arbitration. SM 112 may have administration capabilities compatible with CM 110 interface to automate administration functions. SM 112 may also be capable of acting as a data endpoint for the purpose of participating in a net, broadcast net keys, or simply monitor net traffic.

In one embodiment, the means for requesting the transmission privilege from a CM comprises a push-to-talk (PTT) key or switch. When a user in the NBS 100 desires to transmit information to other net members, the user may depress the push-to-talk switch located on his or her CD, sending a floor-control request to obtain the transmission privilege from CM 110. If no other net member is currently assigned the transmission privilege, the requesting user may be granted the transmission privilege and the user may be notified by an audible, visual, or tactile alert through the CD. After the requesting user has been granted the transmission privilege, information may then be transmitted from that user to the other net member.

In one embodiment of the present invention, each wireless net member establishes a forward link and a reverse link with one or more base stations 116 or a satellite gateway 118, as the case may be. Base station 116 may be used to describe a communication channel from base station 116 or satellite gateway 118 to a CD. Satellite gateway 118 may be used to describe a communication channel from a CD to base station 116 or satellite gateway 118. Voice and/or data may be converted into data packets, using a CD, for example, which are suitable for a particular distributed network 120 through which communications to other users may take place. In one embodiment, distributed network 120 is the Internet.

In one embodiment, a dedicated forward channel is established in each communication system, i.e., a terrestrial communication system and a satellite communication system, for broadcasting information from each net member to the other net members. Each net member may receive communications from other net members over the dedicated channel. In another embodiment, a dedicated reverse link is established in each communication system for transmitting information to CM 110. In one embodiment, a combination of the above schemes may be used. For example, a scheme may involve establishing a dedicated forward broadcast channel but requiring wireless CDs to transmit information to CM 110 over a dedicated reverse link assigned to each CD.

When a first net member wishes to transmit information to other members of the net, the first net member may request the transmission privilege by pressing a push-to-talk key on his or her CD, which generates a request formatted for transmission over the distributed network 120. In the case of CDs 102 and 104, the request may be transmitted over the air to one or more base stations 116. A mobile switching center (MSC) 122, which may include a well-known interworking function (IWF), packet data serving node (PDSN), or packet control function (PCF), for processing data packets may exist between BS 116 and the distributed network 120. For CD 106, the request is transmitted via satellite gateway 118. For CD 108, the request may be transmitted through the public switched telephone network (PSTN) 124 to a modem bank 126. Modem bank 126 receives the request and provides it to distributed network 120. An NBS terminal 128 monitors traffic of the NBS system through its connection to distributed network 120. Since NBS terminal 128 is connected to the distributed network 120, geographic proximity to net participants is not necessary.

If no other member currently holds the transmission privilege, when the CM 110 receives a transmission privilege request, CM 110 may transmit a message to the requesting net member, notifying it that the transmission privilege has been granted. Audio, visual, or other information from the first net member may then be transmitted to the other net members by sending the information to CM 110, using one of the just-described transmission paths. In one embodiment, CM 110 then provides the information to the other net members by duplicating the information and sending each duplicate to the other net members. If a single broadcast channel is used, the information need only be duplicated once for each broadcast channel in use.

In an alternative embodiment, CM 110 is incorporated into MSC 122 so that data packets from supporting base stations are routed directly to CM 110 without being routed onto distributed network 120. In this embodiment, CM 110 is still connected to distributed network 120 so that other communication systems and devices may participate in a group communication. In yet another embodiment, the CM may be incorporated into the PDSN or the PCF modules of the MSC.

In one embodiment, CM 110 maintains one or more databases for managing information pertaining to individual net members as well as to each defined net. For example, for each net member, a database may comprise information such as the user name, account number, a telephone number, or dial number, associated with the member's CD, a mobile identification number assigned to the CD, the current member's status in the net, such as whether the member is actively participating in the net, a priority code for determining how the transmission privilege is assigned, a data telephone number associated with the CD, an IP address associated with the CD, and an indication of which nets the member is authorized to communicate with. Other related types of information may also be stored by the database with respect to each net member.

In one embodiment, the CD may form connections of individual communication terminals to form one talk group, or net. The CM may comprise a variety of functional capabilities in hardware and software that are configurable in different ways to accommodate different applications. The CM may provide capability to manage real-time, administrative, and authenticity operations of (NBS) nets, push-to-talk (PTT) request arbitration, maintenance and distribution of net membership and registration lists, call set-up and tear-down of necessary communication, e.g., CDMA, systems and network resources, as well as overall control of net status.

The NBS net may be within a stand-alone deployable cellular system, or a large multiple site configuration. In the case of a large configuration, multiple CMs may be deployed geographically to form a single, integrated system, each operating as a plug-in module into existing cellular infrastructure. As such, new features introduced by NBS nets are available to cellular users without requiring modification to existing cellular infrastructure.

The CM may maintain a list of defined NBS nets. In one embodiment, each net definition includes a net identifier, a list of members, including phone numbers or other identifying information, user priority information, and other generic administration information. Nets may be statically defined as either clear or secure, and transitions between clear and secure may not be permitted. A secure NBS net typically uses media encryption to provide authentication and guard against eavesdropping. Media encryption for secure nets is implemented on an end-to-end basis, meaning encryption and decryption may take place within the communication device. The CM may operate without knowledge of security algorithms, keys, or policies.

FIG. 2 illustrates an exemplary NBS net 200 for showing how a communication device 202 interacts with a CM 204. Multiple CMs may be deployed as desired for large-scale NBS nets. In FIG. 2, CD 202 has permission to transmit media to other members of the net. In this case, CD 202 is known as the talker and transmits media over a channel. When CD 202 is designated as the talker, the remaining net participants, CD 206 and CD 208, may not have permission to transmit media to the net. Accordingly, CD 206 and CD 208 are designated as listeners.

As described above, CD 202, 206, and 208 are connected to CM 204, using at least one channel. In one embodiment, the channel is divided into separate channels comprising a session initiation protocol (SIP) channel 210, a NBS media signaling channel 212, and a media traffic channel 214. SIP channel 210 and NBS media signaling channel 212 may be used at any time as bandwidth allows by any of the CDs 202, 206, and 208, regardless of being designated a talker or a listener. The SIP is an Internet engineering task force (IETF) defined application-layer protocol that describes control mechanisms to establish, modify, and terminate multimedia sessions operating over Internet protocol (IP). SIP provides a general solution to call-signaling problems for Internet telephony applications by supporting mechanisms to register and locate users, mechanism which define user capabilities and describe media parameters, and mechanisms to determine user availability, call setup, and call-handling.

In one embodiment, SIP channel 210 is used to start and end participation of a CD within the NBS net 100. A session description protocol (SDP) signal may also be used within SIP channel 210. When the CD's participation within the NBS net is setup, e.g., by using SIP channel 210, real-time call control and signaling between the CD and the CM takes place, e.g., by using NBS media signaling channel 212. In one embodiment, NBS media signaling channel 212 is used to handle push-to-talk requests and releases, arbitrate between conflicting requests, or floor control, announce the beginning and end of information transmission, manage net dormancy, track endpoint connectivity, request and exchange net status, and notify any error messages. The protocol of NBS media signaling channel 212 minimizes the length of most common messages, and simplifies the task of interpreting replies and responding to requests while retaining flexibility for future enhancements. The protocol of NBS media signaling channel 212 also allows requests to be resent without adversely affecting protocol state.

In one embodiment, signaling traffic on NBS media channel 212 includes call setup and control signaling, which may consist of session invitation requests and acknowledgements, and media signaling, which may comprise of real-time floor control requests and related asynchronous messages. Media traffic on the media traffic channel 214 may comprise of real-time point-to-multi-point voice and/or data broadcasts. Both messaging categories have unique functional attributes. In addition, each CD may issue domain name service (DNS) client requests to facilitate mapping fully qualified DNS hostnames to Internet network addresses.

In one embodiment, the NBS call-setup and call-control signaling is performed according to SIP semantics. Although SIP may be transported using either the well-known user datagram protocol (UDP) or transmission control protocol (TCP), in one embodiment, each CD performs SIP based signaling functions using UDP. Also, each CM may expect to receive SIP signaling requests via UDP. Real-time signaling may occur via dynamic UDP/IP interface on the CM and each CD. Other signaling may take place via a fixed TCP/IP interface between the CM and the CD using the SIP, for example.

PTT Latency

In one embodiment, when the packet data service is active, resources in the infrastructure, e.g., base station transceiver subsystem (BTS), base station controller (BSC), interworking (IWF), and the radio link are actively assigned to the mobile station (MS). In an IP-based VoIP dispatch service, while there is an active conversation going on between group participants, the packet data connection for each user remains active. However, after a period of inactivity, i.e., "hang time," in the group communications the user traffic channels may transition to the dormant state.

The transition to the dormant state conserves system capacity, reduces serverice cost and battery drain, and makes the user available to receive incoming conventional voice calls. For example, when the user is in an active packet data call, he will generally be considered to be "busy" to incoming voice calls. If the user's packet data call is in the dormant state, the user may be able to receive incoming voice calls. For these reasons, it is desirable to transition the packet data call to the dormant state after periods of packet data inactivity.

While packet data calls are active, even if no data packets are being exchanged, radio frequency (RF) energy may still be transmitted by the mobile phones, albeit at a low level, to maintain synchronization and power control with the base station. These transmissions may cause a significant power drain on the phone. In the dormant state, however, the phone may not perform any RF transmission. To conserve phone power and extend battery life, the hang time may be set to transition the phone to dormant mode after extended periods of no data transmission.

While the packet data service is active for all users, PTT requests, which may be IP datagrams sent between the MS and the dispatch server, have very low latency. However, if the user channels have previously transitioned to the dormant state, the PTT latency may be much longer. During packet data dormancy, state information associated with the packet data session, including the mobile IP address, may be maintained. However, state information associated with layers below PPP, such as the physical traffic layers, may be released and/or de-allocated.

In some infrastructures, to wake up a dormant data connection, the traffic channel must be reallocated, the resources must be reassigned, and the radio link protocol (RLP) layer must be reinitialized. The effect of this is that after a talk group has not talked for a while, when a user presses his PTT button to request the floor, the PTT latency for the first talk spurt is generally much longer than for subsequent talk spurts. While this is relatively infrequent, it can affect the utility of the service, and should be minimized.

In one embodiment, when the group communication devices are in the dormant state, PTT latency may be caused by the following:

1. Talker Channel Assignment Delay—Delay in assigning and initializing a traffic channel for the talker's phone in response to a user pushing a push-to-talk button and the dispatch application initiating an IP-based floor-request message.
2. Floor Request Propagation Delay—Time for a floor-request message to propagate to the dispatch server.
3. Arbitration Delay—Time for the dispatch server to process potentially multiple floor requests.
4. Wakeup Message Delay—Time for the IP messages from the dispatch server to propagate to the cellular infrastructure, e.g., PDSN, serving the listener.
5. Listener Paging Delay—Time delay due to the requirement to wait for the listener's phone to wake up and recieve a page in the appropriate paging channel slot.
6. Listener Channel Assignment Delay—Delay in assigning and initializing the traffic channels of the listeners' phones.

Some of these delays are more significant than others in their contribution to the overall PTT latency. For instance, the talker and listener channel assignment latencies, and the listener paging latency are often an order of magnitude greater than the other components, and together drive the ultimate PTT latency performance.

To reduce the PTT latency, in one embodiment, the group call signaling, such as the floor-control requests, floor-control responses, and dormancy wakeup messages, may be transmitted on some available common channels, without waiting for dedicated traffic channels to be re-established. Such common channels may be always available, regardless of the state of the mobiles, and may not require being requested and reassigned each time a user wishes to initiate a group call. Therefore, the group call signaling may be exchanged even when mobiles are dormant, which may provide a means to re-establish dedicated traffic channels for the talker and listener mobiles in parallel.

In one embodiment, the calling mobile may send a floor-control request to the wireless infrastructure over some available reverse common channels, such as reverse access channel and reverse enhanced access channel. The calling mobile may also receive a response to the floor-control request on some available forward common channels, such as forward paging channel and forward common control channel. In one embodiment, the dormant listener mobiles may receive dormancy wakeup messages on some available forward common channels, such as forward paging channel and forward common control channel.

Short Data Burst Call-Signaling Messages

In one embodiment, a significant reduction in the actual total dormancy wakeup time and the PTT latency perceived by the talker, may be achieved through the use of the short data burst (SDB) messages, as provided in "TIA/EIA/IS-2000 Standards for cdma2000 Spread Spectrum Systems," hereinafter referred to as "the cdma2000 standard," for example. In one embodiment, SDB messages may be sent over both dedicated physical channels, such as the forward fundamental channel (FCH) or forward dedicated common control channel (F-DCCH), or common physical channels, such as the reverse access channel (R-ACH), reverse enhanced access channel (R-EACH), forward common control channel (F-CCCH), or paging channel (PCH). SDB messages may be transported by radio burst protocol (RBP), which maps the messages onto an appropriate and available physical layer channel. Because SDB messages may carry arbitrary IP traffic and may be sent over common physical channels, SDB messages provide a mechanism to exchange group call signaling when a calling client's mobile has no dedicated traffic channels.

Mobile-Originated Call-Signaling Messages

In one embodiment, media-signaling messages may carry IP datagrams over the reverse link or mobile-originated link. A client mobile station may signal the CM quickly whenever the user requests the floor and a dedicated reverse traffic channel is not immediately available. Assuming the client mobile station has released all dedicated traffic channels, the client mobile station may immediately forward the floor-control request over a reverse common channel of a wireless infrastructure, which may relay the request to the CM. For example, either the reverse access channel or the reverse enhanced access channel may be used to send such messages when a dedicated reverse channel is not available. In one embodiment, the client mobile station may transmit a floor-request message to the CM as an SDB Message.

Figure 3:
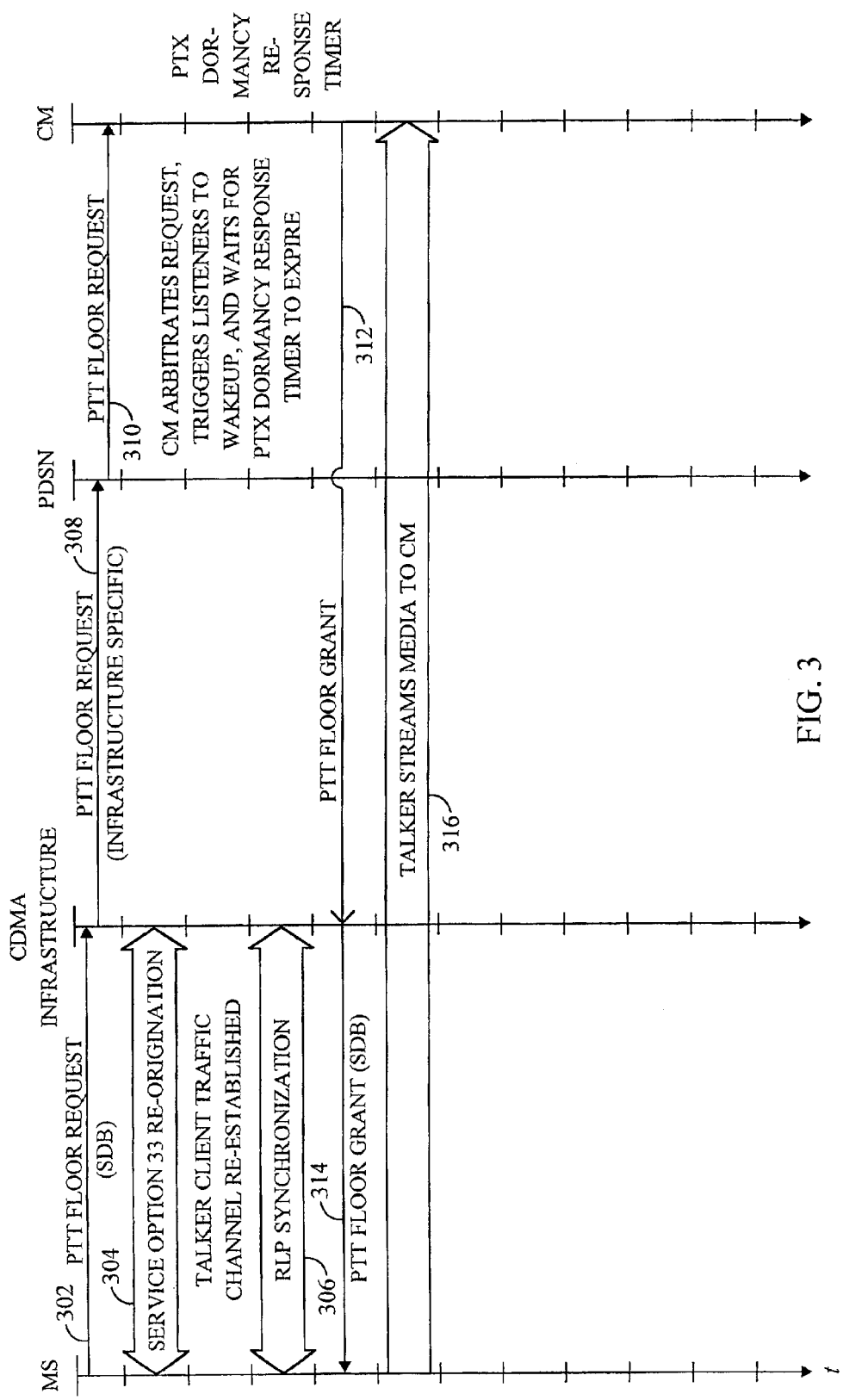
FIG. 3 illustrates call-signaling details for a floor-control request process according to one embodiment.

FIG. 3 shows an exemplary call-signaling for a floor-control request process. The client mobile station (MS) may receive a request from a user who wishes to initiate a group call. In one embodiment, the client MS may be a PTT device. In one embodiment, the client MS may send the PTT floor request 302 over a reverse common channel, such as the access channel or enhanced access channel, before attempting to re-establish its dedicated traffic channel. In one embodiment, the client MS may send the PTT floor request 302 in a SDB message regardless of what channel is used.

The client MS may then start re-establishing its dedicated traffic channel 304, e.g., by performing the "service option 33 re-origination," for example. The client MS may also start radio link protocol (RLP) synchronization 306. In one embodiment, the client MS may re-establish its dedicated traffic channel and synchronize RLP advantageously in parallel with sending the PTT floor request 302.

Therefore, use of the available reverse common channels and/or SDB feature to signal floor-control requests to the CM, when a mobile station does not have active dedicated traffic channels, reduces the total time required to wake up the participating mobiles. Although the talker client may not receive confirmation that its floor-request has been granted until the talker's forward traffic channel is re-established, the ability to quickly signal the CM to begin waking up participating listeners reduces the overall latency.

Referring to FIG. 3, the wireless infrastructure may send the PTT floor-control request 308 to packet data service node (PDSN) and then to the CM. In one embodiment, after receiving the floor-control request 310, the CM may arbitrate the request, burst media signaling wakeup messages (triggers) to a group of target participants (listeners), and/or trigger the re-establishment of participants' (listeners') traffic channels. If the CM grants the PTT floor request, the CM may send PTT floor grant 312 to the infrastructure, which may send PTT floor grant 314 to the client MS. In one embodiment, the infrastructure may send PTT floor grant 314 to the client MS on an available forward common channel, such as forward paging channel and forward common control channel, if the client's dedicated traffic channel is not re-established yet. In one embodiment, the infrastructure may send PTT floor grant 314 to the client MS in SDB form regardless of what channel is used.

In one embodiment, the CM may wait for dormancy response timer to expire before responding to the PTT floor-control request. If the group's dormancy response timer is set to zero, the CM may respond to the floor-control request immediately. In one embodiment, if the client MS has completed re-establishing its traffic channel and RLP synchronization, the client MS may stream media 316, which may have been buffered in the client MS, to the CM.

Network-Originated Call-Signaling Messages

In one embodiment, after receiving the floor-control request, the CM may burst media signaling wakeup messages to a group of target participants (listeners) and trigger the re-establishment of participants' (listeners') traffic channels. If the group's dormancy response timer is set to zero, the CM may respond to the floor control request immediately. In one embodiment, if the talker has began re-establishing its traffic channel immediately upon sending the PTT request, the caller's and listeners' traffic channels may be advantageously re-established in parallel.

Figure 4:
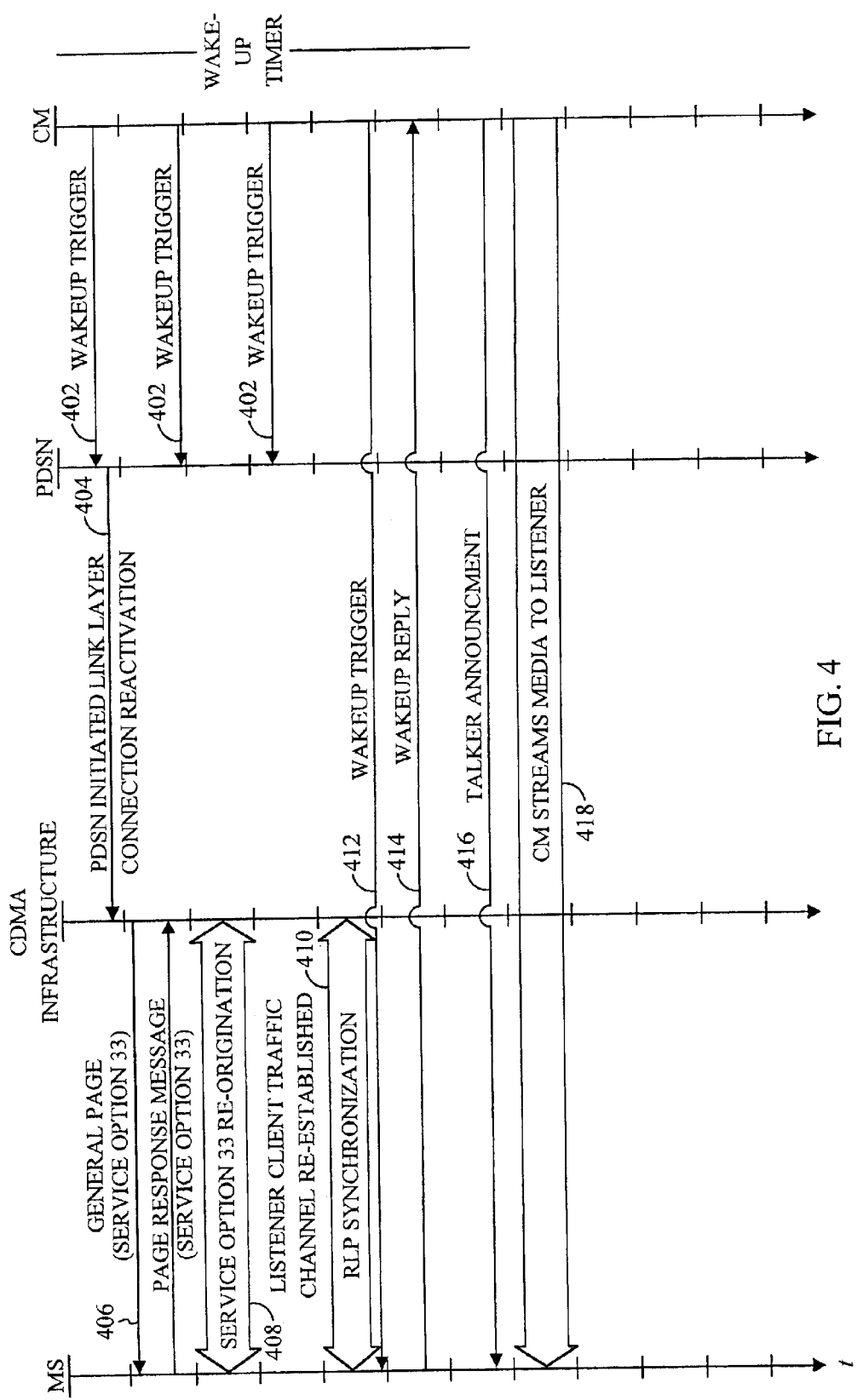
FIG. 4 illustrates call-signaling details for a network-initiated dormancy-wakeup process according to one embodiment.

FIG. 4 shows an exemplary call signaling for a network-initiated dormancy wakeup process. After the CM receives PTT floor-control request 310 (FIG. 3), the CM may send wakeup triggers 402 directed to target listeners. The PSDN may determine whether a packet-data session exists for the target mobile, and forwards the trigger packet to the appropriate infrastructure element, e.g., a base station. The infrastructure may page 406 each individual target MS to start re-establishing its dedicated traffic channel. The target MS may then start re-establishing its dedicated traffic channel 408, e.g., by performing the "service option 33 re-origination," for example. The target MS may also start radio link protocol (RLP) synchronization 410. In one embodiment, the target MSs may re-establish their dedicated traffic channels and synchronize their RLPs advantageously in parallel with same functions being performed by the client MS.

In one embodiment, after a target MS has completed re-establishing its dedicated traffic channel and synchronizing its RLP, the CM may resend the wakeup trigger 412 to the target MS. The target MS may send the wakeup reply 414 to the CM, indicating that the target MS is ready to receive media. The CM may send talker announcement 416 to the client MS before streaming media 418, which may have been buffered in the CM, to the target MS.

In one embodiment, the infrastructure may send the wakeup trigger 412 to a target listener over some available common forward channels, such as forward paging channel and forward common control channel, while the target listeners' traffic channels are not re-established yet. In one embodiment, the infrastructure may send the wakeup trigger 412 to the target listener in SDB form, regardless of what channel is used. If the PTT floor-control request is sent on the talker's reverse common channel as a SDB message and the target group's dormancy response timer is set to zero at the CM, actual PTT latency at the talker client may be reduced to the time required to send an SDB request message on the reverse link followed by a SDB response message on the forward link.

Network Interfaces for Call-Signaling Messages

To determine what network-originated specific traffic, e.g., SDB payload, is sent for an idle mobile station with no dedicated traffic channels, some infrastructure policy or interface for distinguishing such specific traffic from other traffic may be implemented.

In a first embodiment, IP datagrams may be filtered based on their sizes, as the SDB messages may carry a limited user payload. IP datagrams smaller than a predetermined size limit may be sent as SDB message, if destined for a mobile with no dedicated traffic channels. The group communication system may use such filters, as the application floor-request response message is quite small, e.g., 34 bytes including the IP headers.

In a second embodiment, an infrastructure vendor may define an IP-based service for encapsulating IP traffic destined for delivery to a mobile station. An IP server with knowledge of this service may transmit small IP, e.g., UDP, datagrams, appropriately encapsulated with IP headers, to this service for delivery to a mobile suspected of not having a dedicated traffic channel. The group communication systems may use this service to indicate to the infrastructure that the floor-request response message be delivered to the requesting client MS in SDB form, for example. Coordination of SDB traffic with pending pages or service origination requests is also important to insure quick and reliable delivery of user traffic.

In a third embodiment, an IP server may transmit special IP, e.g., UDP, datagrams with IP headers for delivery to a mobile suspected of not having a dedicated traffic channel. The IP server may tag the IP datagrams, e.g., by designating a special value in the IP header, for instructing the infrastructure to deliver the IP datagrams to the client MS. The group communication systems may use this service to indicate to the infrastructure that the floor-request response message be delivered to the requesting client MS in SDB form, for example. In a third embodiment, a UDP or TCP port range may be reserved for delivering specific IP datagrams, e.g., SDB messages.

Mobile-Initiated Service Origination and Paging

In one embodiment, as discussed above in connection with FIG. 3, a talker mobile station (MS) may send a floor-control request 302 to the CM, which may be in SDB form, followed immediately with a service origination request 304 to the wireless, e.g., CDMA, infrastructure for quickly re-establishing its traffic channels. However, if the dormancy response timer is set to a small value, the CM may respond to the floor-control request 310 quickly and transmit a response 312 back to the talker MS. If this response arrives at the infrastructure during the early phases of the service origination transaction 304, the infrastructure notes that the talker MS does not have any active traffic channel and attempts to page the response to the talker MS. However, this paging action may abort the service origination transaction already in progress. In one embodiment, the talker MS may respond to the page, insuring that the floor-control response message is delivered to the talker, and request service origination again, but an unnecessary delay is experienced in re-establishing the talker's traffic channel as a result of the aborted original service origination attempt.

In a first embodiment, to avoid the race condition between the service origination process and paging, the CM may be configured to not respond immediately to the floor-control request 310. Accordingly, the dormancy response timer, e.g., in the CM, may be adjusted so that the CM transmits the response 312 to the talker MS after the service origination process 304 is complete.

In a second embodiment, the PDSN, which receives the CM-initiated response 312, and the mobile switching center (MSC), which responds to the talker's service origination request, are coordinated. That is, if the PDSN determines that a packet-data service origination process for the talker MS is already in progress when the CM-initiated response 312 arrives at the infrastructure, the MSC may defer paging the talker MS. The PDSN may cache the response and send it over the talker mobile's forward traffic channel once the service origination process is complete. Alternatively, the MSC may send the response to the talker MS as an SDB message if the service origination process is still in progress.

In a third embodiment, the talker MS may avoid the race condition by not issuing a service origination request 304 until after the talker MS has received a response to the floor-control request 302. In one embodiment, since the talker MS has no active dedicated traffic channel, the CM may send the response to the talker MS on some available forward common channels, such as forward paging channel and forward common control channel. In one embodiment, the CM may send the response to the talker MS in SDB form. The talker MS may rely on the CM-generated floor-control response 312 to trigger its traffic channel re-activation, in the same fashion that the wakeup requests sent by the CM trigger traffic channel re-activation for the listener mobiles. The race condition is avoided as the potential for simultaneous mobile-initiated service origination and network-initiated paging of the mobile is avoided.

Caching Network-Initiated Packet Data Triggers

The IP datagram, including the wakeup trigger 402, that arrives at the wireless, e.g., CDMA, infrastructure and is destined for a listener mobile that has no dedicated traffic channels may be lost, either by the network in general or by the wireless infrastructure specifically. In one embodiment, the wakeup trigger 402 sent to the listener mobile is retransmitted aggressively according to a defined schedule until the listeners respond or the group's wakeup timer expires. For example, the wakeup trigger 402 may be resent every 500 ms. However, retransmitting the wakeup triggers 402 at this rate may cause a maximum delay of up to 500 ms, or an average delay of 250 ms, from the time a listener's traffic channel is re-established to the time next wakeup trigger destined for that listener arrives at the infrastructure.

In one embodiment, the infrastructure or another entity in the network may cache the wakeup trigger 402 sent by the CM, and deliver it to a target MS as soon as the target MS has re-established its traffic channel. This eliminates the need for retransmission of wakeup request 412 by the CM, and reduces total dormancy wakeup time. Cashing the wakeup trigger 402, as opposed to retransmitting it at the rate of 500 ms, for example, may eliminate a delay of up to 500 ms from the total dormancy wakeup time.

Media Buffering

In one embodiment, the user may be allowed to start talking after the user has requested floor control, by buffering the media before dedicated channels are re-established between the client and the listeners. By buffering the talker's speech, the system allows the talker to start talking before the listeners' traffic channels have been fully re-established. This allows the talker to start talking earlier, reducing his apparent PTT latency. Since listeners don't experience PTT latency, their experience is unaffected, i.e., the PTT latency is shifted from the talker to other parts of the system. The talker may wait just as long to receive a response from a listener to his first talk spurt, but as mentioned previously, he already expects the response to his first talk spurt to take longer than the response to subsequent talk spurts that occur while he is engaged in an active conversation. Buffering of the talker's first talk spurt can be done on the CM side or on the client MS side.

CM Buffering

In one embodiment, the CM may buffer the talker's first talk spurt. After a user has pressed his PTT button and the user's traffic channels are re-established, he may be allowed to communicate with the CM. At this time, since the listener traffic channels are not yet up, the CM buffers the talker's speech for future transmission to the target listeners. CM buffering may reduce the apparent PTT latency that the talker sees to the approximate time it takes to bring up the talker's traffic channel. FIG. 5 shows CM buffering according to one embodiment.

Client Side Buffering

In one embodiment, where a shorter apparent latency is desired, the talker may be allowed to begin speaking before even his traffic channel is re-established. Because the client MS is not yet in communication with the CM, the signal to the talker to begin talking is made by the client MS. If the talker is allowed to speak before the talker's traffic channel is re-established, the client MS may buffer the speech. Because communication with the CM has not yet been established, permission to talk is being given "optimistically." FIG. 6 shows client-side buffering according to one embodiment. In one embodiment, both CM buffering and client-side buffering may operate concurrently. Client-side buffering may allow the apparent PTT latency to be small.

As with CM buffering, the total delay may not alter. The user may still experience the same delay in receiving a response back from the listener, but the talker's apparent PTT latency may be made small.

In one embodiment, the client MS may buffer media to control the apparent PTT latency experienced by the user. The combination of mobile-originated SDB and client-side media buffering may reduce the delays associated with re-establishing active traffic channels.

Quick Paging Channel

In one embodiment, the CM may delay responding to the talker's PTT request until the group's wakeup timer expires or all listener clients have responded to a network-initiated trigger to bring up their respective traffic channels. The CM may wait until all listeners are paged before allowing the talker to stream media at the group. The longer the group's listeners take to respond to the page, the longer the talker's perceived PTT latency.

In one embodiment, during dormancy wakeup, each listener client is individually sent a series of wakeup triggers by the CM, which upon arrival at the, e.g., CDMA, infrastructure, trigger one or more pages to each mobile. After receiving the page, each mobile may re-establish a traffic channel, receive the next wake up request transmitted to it, and respond to the CM with a wake up request reply. A major component of the time required by listener handsets to respond to this application level "ping" is spent at the infrastructure waiting for an appropriate time to page the mobile.

To conserve battery life, mobiles may not need to constantly monitor each of the, e.g., 2048, slots defined within the paging channel when the mobiles are in the idle state. Rather, mobiles may monitor either the forward common control channel (F-CCCH) or the forward paging channel (F-PCH), depending on the mobile's capabilities. Furthermore, mobiles may monitor the paging slot according to their slot cycle index.

In one embodiment, to conserve battery life, the mobiles may operate in "slotted paging" mode. In this mode, the mobiles wake up periodically for a short time to listen to pages sent by the base station (BS). The BS, which may know when mobiles will be listening, may send pages to a particular mobile during the particular paging slots.

In one embodiment, the period that the mobile wakes up to listen to the paging channel is controlled by a parameter called the slot cycle index (SCI). The larger the SCI, the longer the time between the slots that the mobile wakes up to listen to the paging channel. A large slot cycle value increases phone standby time, since the phone spends a larger percentage of its time sleeping, but increases the time the BS might need to wait before it can page the phone.

The amount of time the BS may need to delay its page to the phone varies between zero, if the phone's slot is just starting when the BS needs to page it, to the full slot cycle, if the phone's slot has just ended when to the BS needs to page the phone. On average, the delay due to waiting for the phone's slot to come around is half the slot cycle period. The shorter the slot cycle used by a mobile, the faster a listener may be paged by the infrastructure. However, a shorter slot cycle may imply a higher rate of battery drain.

In one embodiment, the forward quick paging channel (F-QPCH) may be used to allow the mobile to determine, in a power-efficient manner, when a pending page is present without requiring that the mobile monitor the paging channel itself. A mobile that is capable of monitoring the F-QPCH may wake up every predetermined number of slots to extract the value of a one-bit indicator within a, e.g., 80 ms, slot on the paging channel. If the extracted bit is not set, no page is pending on the paging channel and the mobile sleeps for another slot cycles. If the extracted bit is set, a page for that mobile may be pending and the mobile may schedule itself to wake up and monitor the paging channel at the next appropriate paging channel slot.

The modulation employed by F-QPCH allows the mobile to monitor the F-QPCH much more efficiently than it can monitor the paging channel. This allows the mobile to effectively operate at a very short slot cycle in a power-efficient manner. One advantage of using the F-QPCH is to provide the mobile with the means to detect and respond to general page messages from the infrastructure, and hence wakeup request messages from the CM, at a faster slot cycle than would otherwise be allowed at the same battery drain rate. This in turn translates to the ability to minimize one component of the delay that contributes directly to PTT latency and the total dormancy wakeup time—the time required to re-establish listener traffic channels.

Slotted Timer

In one embodiment, the mobiles may operate in a non-slotted paging mode in conjunction with a "slotted timer." When activated, the slotted timer requires the mobile to monitor the paging channel in a non-slotted mode upon releasing its dedicated traffic channels and entering the idle mode for a period of time defined by the slotted timer. The value of this timer is configurable at the base station. This feature allows the infrastructure to instruct the mobile to monitor every, e.g., 80 ms, slot on the paging channel when in the idle mode and provides a means for the infrastructure to page the mobile in any slot. As in the case of using the quick paging channel feature alone, one advantage of using the non-slotted mode is to provide a means for the mobile to detect and respond to pages more quickly than would otherwise be allowed at the same battery drain rate, and hence to reduce the time required to re-establish listeners' traffic channels during dormancy wakeup.

Without the quick paging channel feature, extended use of non-slotted monitoring may be expensive on battery life. However, using the quick paging channel and non-slotted mode together provides a means to page a mobile almost immediately—within one or two slot periods, e.g., 80 to 160 ms.

Non-slotted mode can be viewed as one of two intermediate stages of dormancy available to a mobile station. When operating in non-slotted mode, a mobile may be considered technically dormant because it has no dedicated physical channels. However, in this mode the mobile may be paged essentially immediately in any slot, and thus the paging delay associated with network-initiated reactivation is avoided.

Control-Hold Mode

In one embodiment, the mobiles may operate under a packet data standard that provides an additional dormant/idle state in which the mobile and infrastructure maintain the PPP layer state associated with the mobile while allowing either endpoint to release the dedicated traffic channels and other resources associated with the mobile's packet-data service option call. Either the mobile or the infrastructure may transition the state of the packet data call from dormant/idle state to active state by re-establishing a traffic channel and renegotiating RLP. The time required to re-establish the traffic channel may be dependent on whether the mobile or the infrastructure initiates the re-establishment. However, in both cases the delay is comparable to that required to originate a new call on the system, as essentially all system resources may need to be requested and allocated to the mobile.

Figure 7:
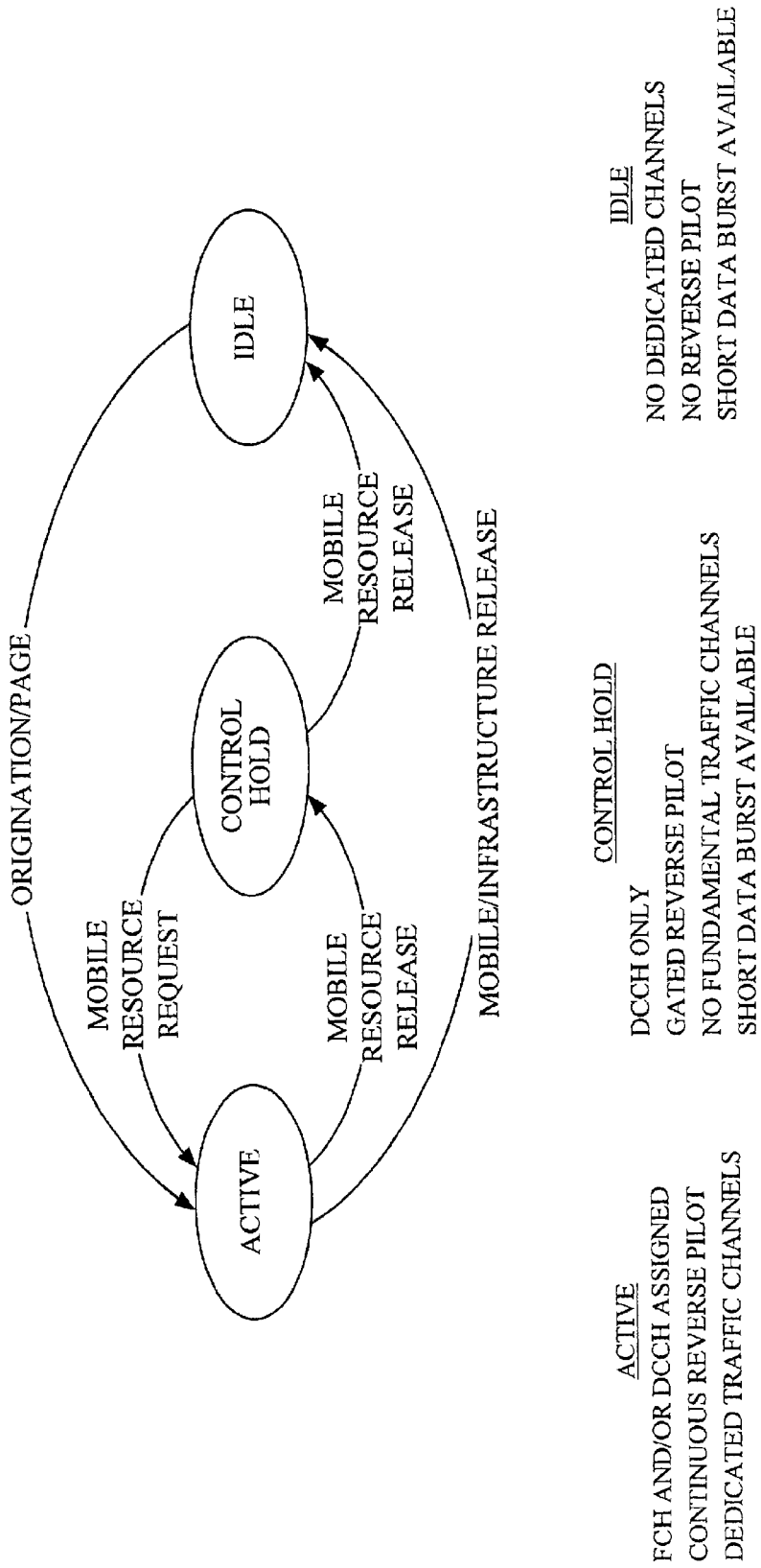
FIG. 7 illustrates exemplary radio-link modes according to one embodiment.

In one embodiment, the mobiles may operate in a "control-hold" mode that operates as an interim position between the active and idle modes. In control-hold mode, the dedicated traffic channels associated with the mobile may be released and the mobile's reverse pilot may operate in "gated" mode. In one embodiment, the dedicated common control channel and/or the RLP state may also maintained. In essence, the control-hold mode offers a semi-dormant state in which most system resources may remain allocated, but the average reverse-link transmission power is reduced to a gated pilot in order to reduce the impact to system capacity. FIG. 7 shows an exemplary arrangement for radio modes.

In one embodiment, mobiles may transition from active mode to control-hold mode by sending either a resource release request message or a resource release request mini message. Mobiles may transition from control-hold mode to active mode by sending either a resource request message or a resource request mini message. These messages may be transported via the dedicated control channel, and the mini-messages may be sent using shorter, e.g., 5 ms, frames, allowing fast transitions into and out of control-hold mode. On advantage of the control-hold mode, compared to the traditional idle mode or the dormant/idle mode, as described above, is the relatively fast transition possible from control-hold mode to active mode.

In one embodiment, upon receiving an indication from the CM that a subscribed group has transitioned to the group-dormant state, a client mobile may initially transition itself to the control-hold mode and, after an additional sustained period of inactivity, make a further transition to the idle mode. Therefore, control-hold mode offers a mechanism to significantly reduce the time required to re-establish dedicated traffic channels once a user presses PTT or a wakeup request trigger is received at the infrastructure.

Stored Service Configuration

In one embodiment, the infrastructure may provide the ability to cache or store service configuration state at the mobile and infrastructure when transitioning to idle mode. When returning back to the active mode and re-establishing traffic channels, the mobile may indicate, in either the origination message or page response message, that it has cached or stored a service configuration for the call. The mobile may also include in the origination or page response message a cyclic redundancy check (CRC) that may be calculated over the entire length of the service configuration. If the base station has also cached the service configuration, the base station may use the received CRC to confirm that its service configuration matches the mobile's stored service configuration and, if so, the BS may indicate in its "service connect message" that the mobile may use the previously stored service configuration.

In one embodiment, the use of the packet-data service option may not require service configuration changes when transitioning out of the idle mode, and hence use of the stored service configuration may result in a significant reduction in the time-required to re-establish dedicated traffic channel resources. Therefore, the stored service configuration feature implements an important enhancement to the idle mode by providing a mechanism to significantly reduce PTT latency by reducing the time required to re-establish traffic channels which may carry both PTT signaling and related media.

In one embodiment, the transition to the idle mode from the active mode for a client MS may be implemented as follows:

1. The group is active and the mobile has dedicated traffic channels.
2. After a period of inactivity exceeding the group's hang time timer, an application layer group-dormant announcement is received over the mobile's forward traffic channel.
3. The mobile transitions to the control-hold mode, caching the state of its service configuration. Likewise, the client's base station also caches the state of the service configuration.
4. After a period of inactivity, the mobile releases its dedicated channel and transitions to the idle mode. The mobile begins monitoring the quick paging channel and may enter non-slotted mode if instructed by the infrastructure. If the period of inactivity is relatively short—either due to the local user pressing PTT or network-originated packet data traffic from another group participant—the mobile may not reach the idle mode before transitioning back to the active mode. In this case, the transition back to the active mode occurs quickly, as the mobile has retained its dedicated channel.

In one embodiment, the dormancy wakeup event may be implemented as follows:

1. The group is dormant and all the mobiles are idle with no dedicated physical channels. The mobiles are monitoring the quick paging channel.
2. In response to a user pressing push-to-talk, the talker's mobile signals the CM with an application layer floor-request message over some available reverse common channel, which may be in short data burst form. The talker's mobile may begin buffering user media from this point forward.

3. The talker's mobile sends an "origination message" to the infrastructure to re-establish its traffic channel. It may indicate in its request that it has cached the service configuration and may include a CRC over the configuration data. This begins the process of re-establishing the talker's mobile traffic channel.

4. The CM receives the floor-request and decides whether to grant the request or not, through an arbitration process and sends floor-request response messages to the talker. The CM also begins bursting a series of wakeup requests to all participants.

5. Upon receipt of each wakeup request, the infrastructure pages each listener's mobile by first determining the next appropriate slot in which to page the listener's mobile and then signaling via the F-QPCH prior to that slot that a page will be pending on the paging channel for that listener's mobile.

6. Upon receipt of an indication on the F-QPCH that a page is pending, each listener mobile monitors the paging channel for a page.

7. Upon receipt of a page on the paging channel, each listener mobile responds to the page, indicating in its page response that it has cached the service configuration and may include a CRC over the configuration data. This begins the process of re-establishing each listener's traffic channel.

8. After establishment of the talker's traffic channel, the next floor-request response from the CM is received at the talker. The talker begins streaming media to the CM.

9. After establishment of each listener's traffic channel, the next wakeup request sent by the CM is received at the listener. The listener replies with a wakeup response message.

10. Once all listeners have responded or the group's wakeup timer expires, the CM begins streaming media to the group.

Therefore, the herein disclosed embodiments for a method and apparatus for reducing latency in a group communication network provides for a significant reduction in the actual total dormancy wakeup time and the PTT latency by exchanging group call signaling even when mobiles are dormant and no traffic channel is active. The method and apparatus provides for exchanging the group call signaling through the use of the short data burst (SDB) message signaling. The method and apparatus provides for re-establishing dedicated traffic channels for the talker mobile and the dormant listener mobiles advantageously in parallel.

In another embodiment, the dormant-wakeup latency in a group communication network may be reduced through caching the network-initiated wakeup triggers destined for target listeners, and delivering a wakeup trigger to a target mobile station as soon as the target mobile station has re-established its traffic channel.

In another embodiment, simultaneous service origination and paging in a mobile operating in a group communication network is avoided by transmitting a response to a floor-control request after the service origination process is complete. In one embodiment, the response to the floor-control request may be in SDB form if the service origination process is not complete. In another embodiment, the service origination process for the source communication device is initiated after transmitting the response to the source communication device.

What is claimed is:

1. In a controller operating in a group communication network, a method for putting a net into a dormant mode, the method comprising:
   determining whether the net has been inactive for a predetermined first time period;
   if it is determined that the net has been inactive for the predetermined first time period, causing each member of the net to enter a control-hold mode, wherein said each member of the net maintains its dedicated traffic channel;
   determining whether said each member of the net has been in the control-hold mode for a predetermined second time period; and
   if it is determined that said each member of the net has been in the control-hold mode for the predetermined second time period, causing said each member of the net to enter a dormant mode, wherein said each member of the net releases its dedicated traffic channel.

2. The method of claim 1, wherein if it is determined that said each member of the net has not been in the control-hold mode for the predetermined second time period, further including:
   causing said each member of the net to return to an active mode, wherein said each member of the net maintains its dedicated traffic channel, if a member of the net requests a group call.

3. In a controller operating in a group communication network, a computer-readable medium embodying a method for putting a net into a dormant mode, the method comprising:
   determining whether the net has been inactive for a predetermined first time period;
   if it is determined that the net has been inactive for the predetermined first time period, causing each member of the net to enter a control-hold mode, wherein said each member of the net maintains its dedicated traffic channel;
   determining whether said each member of the net has been in the control-hold mode for a predetermined second time period; and
   if it is determined that said each member of the net has been in the control-hold mode for the predetermined second time period, causing said each member of the net to enter a dormant mode, wherein said each member of the net releases its dedicated traffic channel.

4. The computer-readable medium of claim 3, wherein if it is determined that said each member of the net has not been in the control-hold mode for the predetermined second time period, the method further including:
   causing said each member of the net to return to an active mode, wherein said each member of the net maintains its dedicated traffic channel, if a member of the net requests a group call.

5. A controller operating in a group communication network, comprising:
   means for determining whether the net has been inactive for a predetermined first time period;
   means for, if it is determined that the net has been inactive for the predetermined first time period, causing each member of the net to enter a control-hold mode, wherein said each member of the net maintains its dedicated traffic channel;
   means for determining whether said each member of the net has been in the control-hold mode for a predetermined second time period; and means for, if it is determined that said each member of the net has been in the control-hold mode for the predetermined second time period, causing said each member of the net to enter a dormant mode, wherein said each member of the net releases its dedicated traffic channel.

6. The controller of claim 5, wherein if it is determined that said each member of the net has not been in the control-hold mode for the predetermined second time period, further including:

means for causing said each member of the net to return to an active mode, wherein said each member of the net maintains its dedicated traffic channel, if a member of the net requests a group call.

7. A controller for providing a dormant mode, comprising:

a receiver;

a transmitter; and a processor communicatively coupled to the receiver and the transmitter, the processor being capable of:

determining whether the net has been inactive for a predetermined first time period;

if it is determined that the net has been inactive for the predetermined first time period, causing each member of the net to enter a control-hold mode, wherein said each member of the net maintains its dedicated traffic channel;

determining whether said each member of the net has been in the control-hold mode for a predetermined second time period; and if it is determined that said each member of the net has been in the control-hold mode for the predetermined second time period, causing said each member of the net to enter a dormant mode, wherein said each member of the net releases its dedicated traffic channel.

8. The controller of claim 7, wherein if it is determined that said each member of the net has not been in the control-hold mode for the predetermined second time period, the processor further being capable of:

causing said each member of the net to return to an active mode, wherein said each member of the net maintains its dedicated traffic channel, if a member of the net requests a group call.

* * * * *